G. C. DAVISON.
CLUTCH.
APPLICATION FILED SEPT. 29, 1917.
1,255,715.
Patented Feb. 5, 1918.
5 SHEETS—SHEET 4.
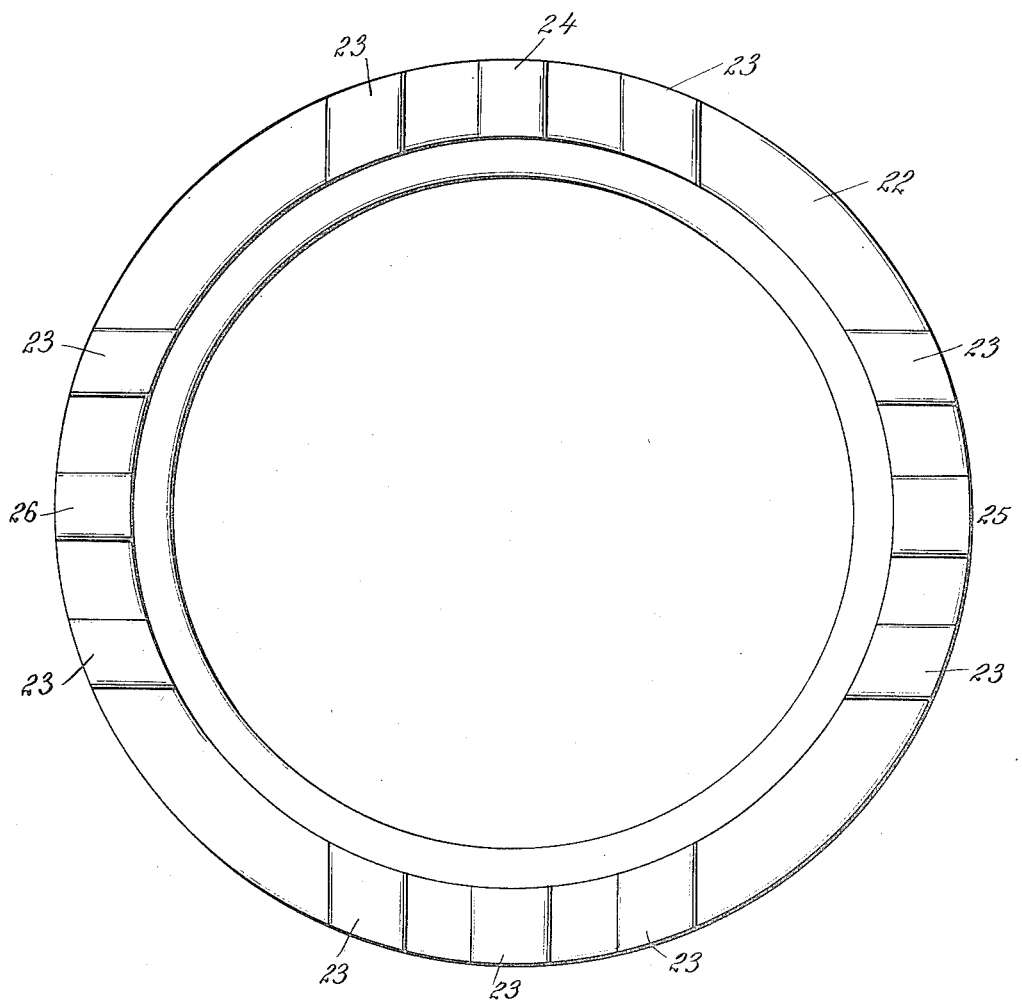
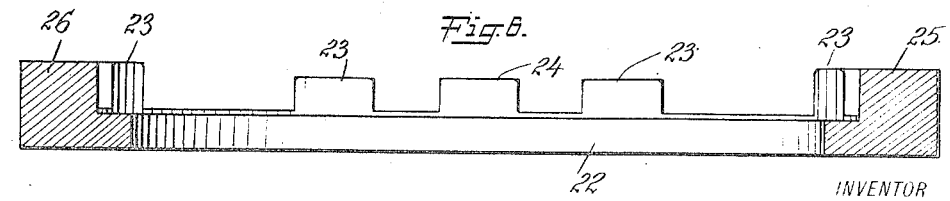

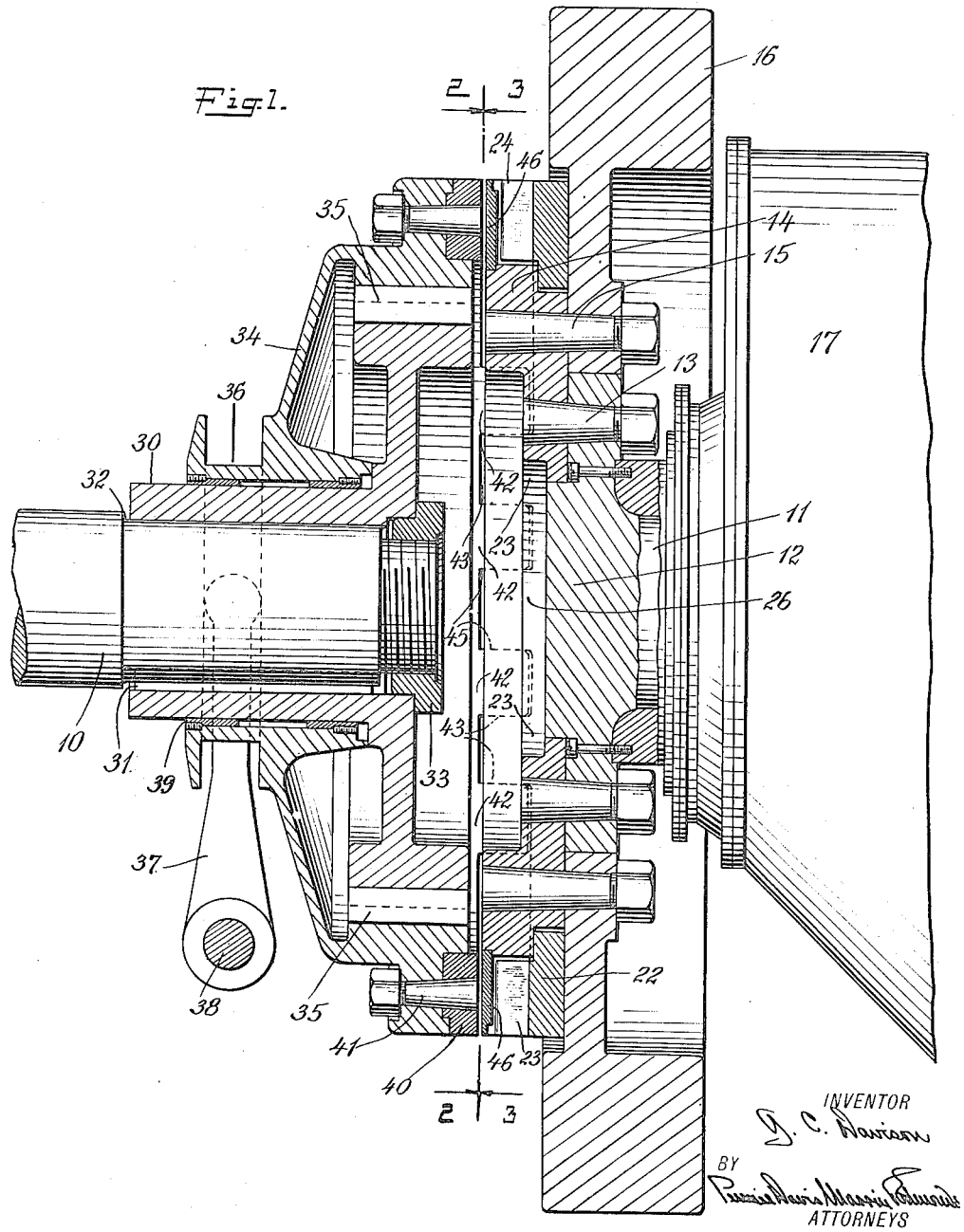

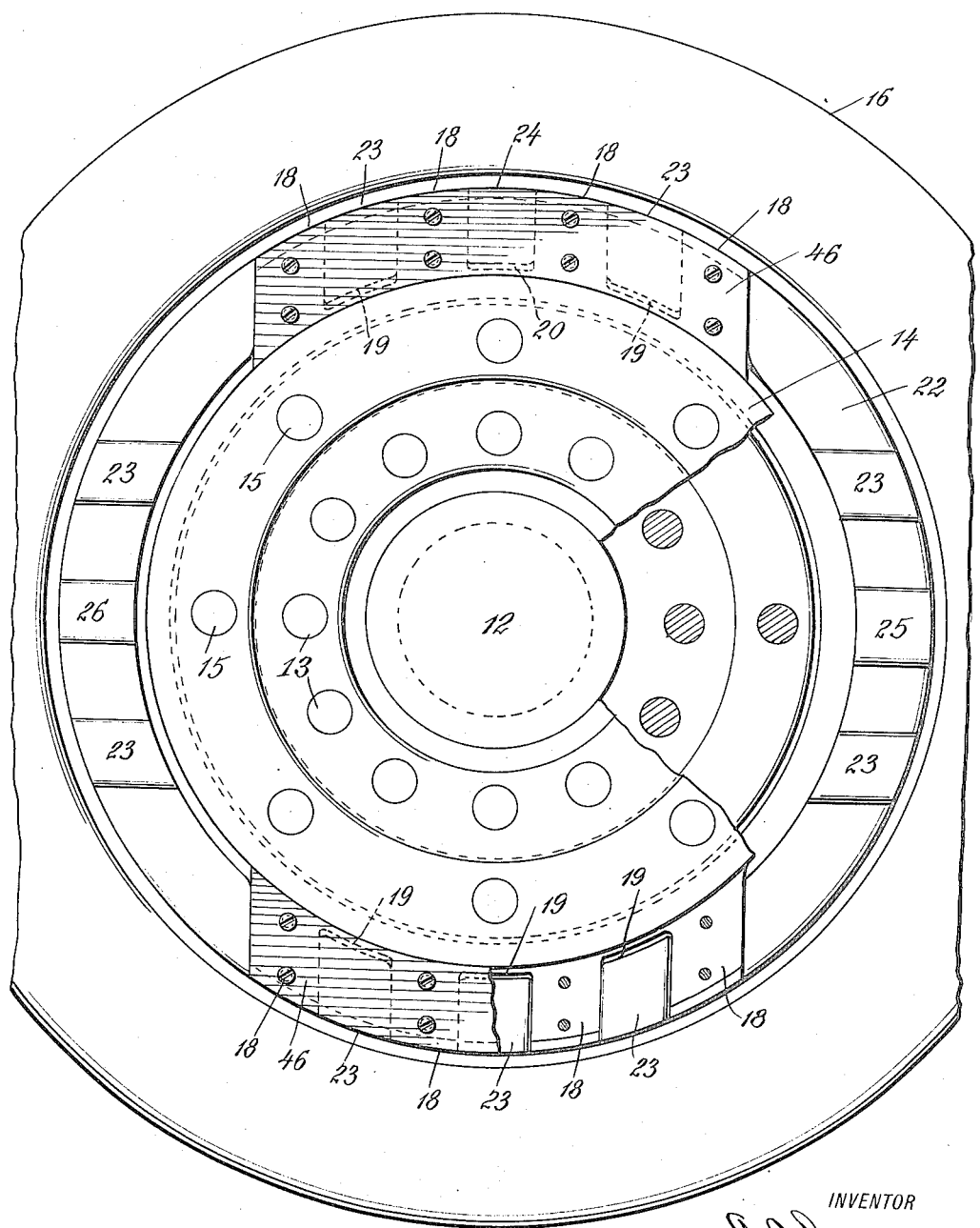

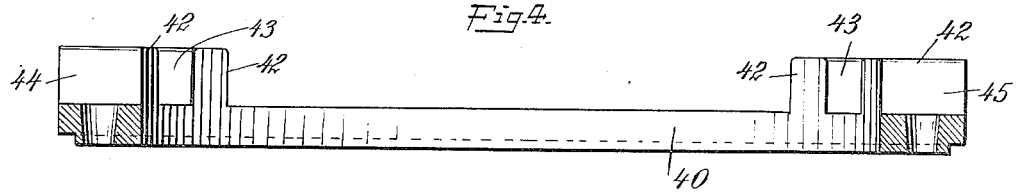
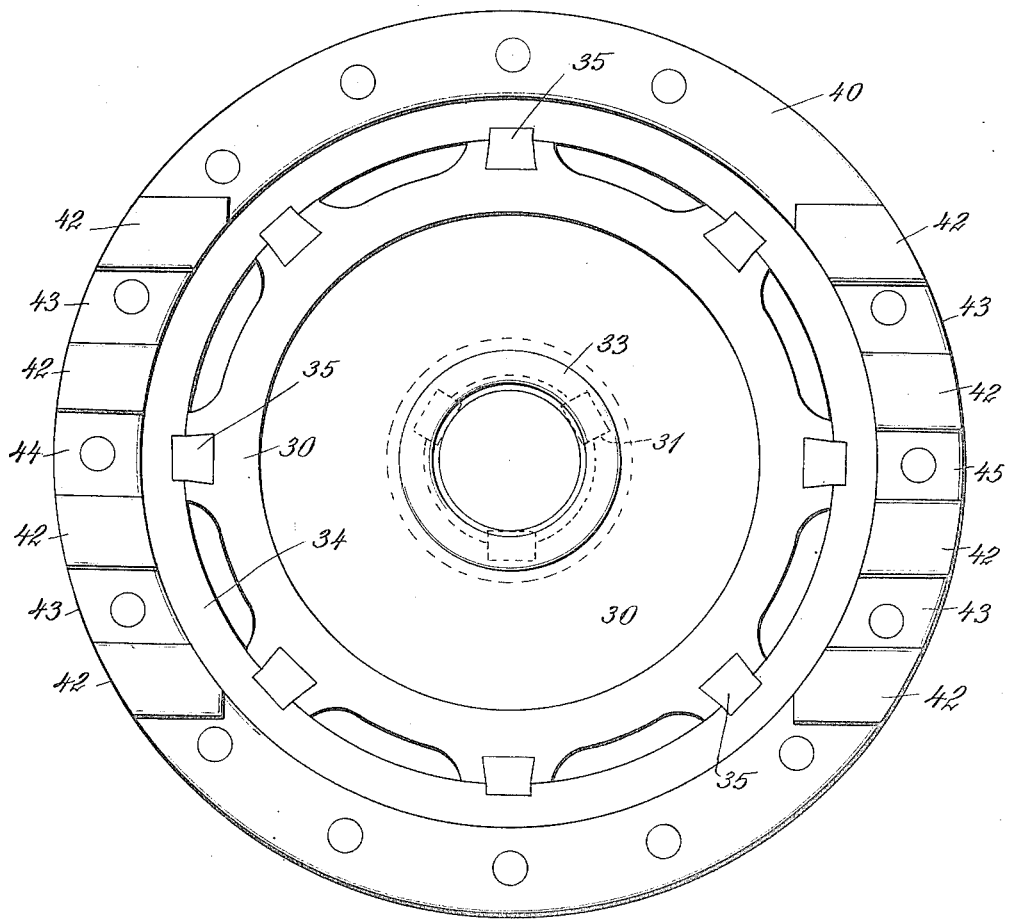

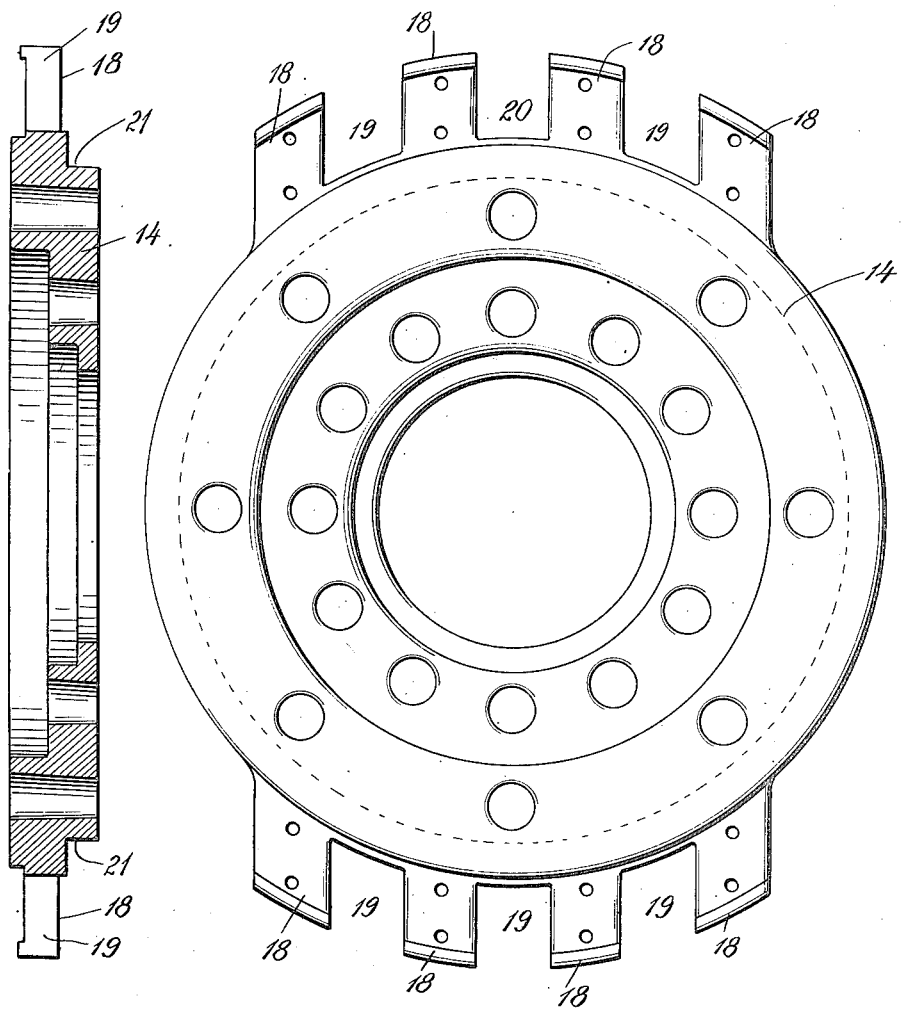

UNITED STATES PATENT OFFICE.

GREGORY C. DAVISON, OF NEW LONDON, CONNECTICUT, ASSIGNOR TO ELECTRIC BOAT COMPANY, A CORPORATION OF NEW JERSEY.

CLUTCH.

1,255,715.

Specification of Letters Patent.

Patented Feb. 5, 1918.

Application filed September 29, 1917. Serial No. 193,896.

*To all whom it may concern:*

Be it known that I, GREGORY C. DAVISON, a citizen of the United States, residing at New London, in the county of New London, State of Connecticut, have invented certain new and useful Improvements in Clutches; and I do hereby declare the following to be a full, clear, and exact description of the invention, such as will enable others skilled in the art to which it appertains to make and use the same.

The present invention is directed to the provision of an improved form of clutch adapted for various uses but of special utility in installations where it may be desired that one or both of two engines be coupled together at will upon the same line of shafting.

As an example of such a use of two engines, there are certain types of submarine boats in which one engine may be used to drive the vessel under normal speeds for cruising purposes while for maximum speed a second engine is provided which may also be coupled to the propeller shaft. Under ordinary cruising speeds, this second engine may be used for other purposes, such as running a generator for charging the storage batteries. It is essential that the crankshafts of the two engines be always connected together in a certain angular relationship in order that the cranks of the engines shall be disposed in symmetrical positions to give the best balance. Since with the above arrangement one engine may be running more than the other, its bearings may wear down more rapidly and hence the clutch should be of such a construction as to allow for a certain misalinement of the two shafts. The clutch should also permit the engines to be coupled together while running, to avoid the loss of progress that would result if it were necessary to shut down the engines, jack the shafts into proper relationship, and then couple them together.

A clutch fulfilling all of the above requirements and which at the same time is simple in construction, easily assembled, and not subject to excessive wear, is shown in the accompanying drawings, in which, Figure 1 is a sectional view showing the clutch members in coupled position;

Fig. 2 is an elevational view of the end of the clutch members to the right of the section line of Fig. 1;

Fig. 3 is a similar view of the clutch members to the left of this line;

Fig. 4 is a cross-section of the clutch member shown in Fig. 3;

Fig. 5 is a view of one of the annular components of the clutch member shown in Fig. 2;

Fig. 6 is a cross-section of the annular member shown in Fig. 5;

Fig. 7 is a view of the other one of the annular components of the clutch member of Fig. 2; and Fig. 8 is a cross-section of the annular member of Fig. 7.

Referring to the drawings, in which similar reference characters denote similar parts throughout the several views thereof, 10 is a main shaft to which one engine is permanently connected. This shaft, at the end not shown in the drawings, is adapted to be connected to the propeller shaft in any desired manner. 11 denotes a second main shaft to which another engine is permanently connected. Each of the shafts is of course mounted in appropriate bearings not shown on the drawings. The shaft 11 is formed with a head 12 to which is attached by bolts 13 an annular clutch member 14, to which is fastened by bolts 15 the fly-wheel 16 of the engine connected to the shaft 11. A housing about the shaft 11 is shown at 17.

The clutch-ring 14 is shown in detail in Figs. 7 and 8 and comprises an annular portion provided on its periphery with two groups of parallel lugs 18 forming clutch-jaws. The jaws 19 between the lugs of both groups are all of the same width except the middle jaw 20 of one group which is of different width for a purpose which will hereinafter appear. As shown in Figs. 1 and 8, the ring 14 is cut away as at 21 so that when in position against the fly-wheel a recess is formed in which is fitted the inner periphery of an intermediate annular clutch member 22 shown in detail in Figs. 5 and 6. This ring 22 has twelve projections in the form of upstanding lugs. These lugs are divided into groups of three each and the several groups are disposed symmetrically about the center of the ring. The faces of the lugs of two opposite groups are at right angles to the faces of the lugs of the other two groups. The lugs designated 23 (Fig. 5) are all of the same width but the middle lug 24 of one group is somewhat narrower so that this clutch ring 22 can only be engaged with clutch ring 14 in one relationship, namely, with the lug 24 within the jaw 20 and the other lugs 23 within jaws 19.

The internal diameter of clutch ring 22 is somewhat greater than the external diameter of the corresponding portion of clutch ring 14, so that when the former is in place upon the latter as shown in Fig. 1, a space is provided for a limited amount of play of the clutch member 22 at right angles to the shaft 11 in a direction permitted by the engaging clutch lugs.

The lugs 25 and 26 on opposite sides of the ring 22 are of unequal width and one is wider and the other narrower than the remaining lugs 23 of these two groups for a purpose which will presently appear.

Upon the shaft 10 is a clutch body 30 which is prevented from rotating on shaft 10 by means of a key 31. The end of the main shaft 10 is made smaller so that the clutch body is retained in place between the shoulder 32 and a nut 33 threaded on the end of the shaft. A clutch sleeve 34 is slidably mounted upon the clutch body 30 in any convenient manner, preferably by means of keys 35. This clutch sleeve has a circumferential groove 36 within which are placed the ends of a fork 37 attached to a shaft 38 which may be manipulated by any desired mechanism for shifting the clutch sleeve. In order to lessen the wear between the clutch sleeve and the clutch body, bearing rings 39 may me provided.

A third clutch ring 40 is attached to the face of the clutch sleeve 34 by bolts 41. This clutch ring 40 has, as shown in Figs. 3 and 4, two groups of upstanding lugs 42 forming between them clutch jaws adapted to engage corresponding jaws on the intermediate ring 22 when the clutch is coupled as shown in Fig. 1. The outer clutch jaws 43 of each group on ring 40 are of the same width and are adapted to receive the corresponding lugs 23 of the intermediate clutch member 22. The middle jaws 44 and 45 of these two groups are of different widths and are adapted to be engaged by the lugs 25 and 26 respectively of the intermediate clutch member 22. Thus the clutch rings 40 and 22 can only be connected in one relationship. In order to prevent any possibility of the clutch-jaws on member 40 engaging the lugs of the member 14 instead of the lugs of member 22 when it is attempted to couple the clutch-members together, plates 46 are attached to the lugs 18 of member 14, as shown in Fig. 2.

When the engines are uncoupled, the clutch sleeve 34 will be shifted to the left along the clutch body 30. Thus the shaft 10 will rotate freely with respect to the shaft 11. When it is desired to clutch the two shafts together the engines should be brought to nearly the same speed and the sleeve 34 urged to the right, but the lugs of clutch member 40 will only engage the corresponding lugs of member 22, when the two shafts have a definite angular relationship, which is that necessary to balance the cranks of the engines. During the operation of throwing in the clutch, the lugs 42 of member 40 will ride over the plates 46 and finally enter the corresponding jaws of intermediate member 22.

When the members are coupled together, the intermediate annular member 22 cannot turn relatively to either of the other annular members but it can slide in directions permitted by the shape of the jaws. The direction of sliding of ring 22 relative to the clutch ring 14 with which the intermediate ring 22 is permanently interlocked is at right angles to the direction of sliding of ring 22 relative to the ring 40 on the other shaft; thus the axes of the two shafts may be displaced slightly with respect to each other and yet the above construction will permit them to be coupled together without throwing extra loads on the bearings or parts of the clutch. If the two shafts are not in parallel axial alinement this defect will be taken care of by a slight tilting of the rings relative to each other, there being sufficient play to permit this to occur. With the intermediate ring 22 held as herein described, even a considerable amount of wear on the clutch will not permit it to become unduly loose and rattle, as its motion is limited by the method of retaining it in place.

Furthermore, the location of both the driving and driven jaws in substantially the same plane perpendicular to the axis of the shaft avoids giving rise to any forces tending to displace the intermediate clutch member 22, as in many forms of coupling. This reduces the wear and contributes to the smooth running of the clutch.

Before attempting to throw in the clutch, the engines should be brought to nearly the same speed, whereupon the clutch can be thrown in directly without further attention on the part of the operator and a proper relation of the engine cranks will always be insured.

While the invention has been illustrated by means of a clutch in which slotted jaws on the member 14 are engaged by upstanding lugs on the member 22 and in which the upstanding lugs on the member 22 engage the lugs of member 40, the invention contemplates the reverse arrangement, as for instance, that in which the member 14 is provided with upstanding lugs and the member 22 is slotted in a manner analogous to that disclosed above in connection with the ring 14. It will also be understood that various other modifications or changes in the details of construction of the invention may be made without departing from the principle thereof.

I claim:

1. A clutch comprising the combination of a shaft, a clutch member fastened thereto and having a plurality of jaws, a second shaft, a member slidably mounted on said second shaft, a second clutch member attached to said slidable member and having a plurality of jaws, and an intermediate clutch member associated with said first shaft and having a set of jaws engaging the jaws of said first clutch member and having also a second set of jaws adapted to be engaged by the jaws of said second clutch member when said slidable member is moved on said second shaft; substantially as described.

2. A clutch comprising the combination of a shaft, a clutch member fastened thereto and having a plurality of jaws, a second shaft, a member slidably mounted on said second shaft, a second clutch member attached to said slidable member and having a plurality of jaws, an intermediate clutch member associated with said first shaft and having a set of jaws engaging the jaws of said first clutch member and having also a second set of jaws adapted to be engaged by the jaws of said second clutch member when said slidable member is moved on said second shaft, and means for preventing the engagement of the jaws of said second clutch member with the first set of jaws of said intermediate member; substantially as described.

3. A clutch comprising the combination of a shaft, a clutch member fastened to said shaft and having a plurality of jaws, a second shaft, a member slidably mounted on said second shaft, a second clutch member attached to said slidable member and having a plurality of jaws, and an intermediate clutch member permanently associated with said first-named shaft and having a set of upstanding lugs engaging the jaws of said first clutch member, and a second set of upstanding lugs adapted to be engaged by the jaws of said second clutch member when said slidable member is moved on said second shaft; substantially as described.

4. A clutch comprising the combination of a shaft, a clutch member fastened to said shaft and having a plurality of slotted jaws, a second shaft, a member slidably mounted on said second shaft, a second clutch member attached to said slidable member and having a plurality of slotted jaws, and an intermediate clutch member associated with said first-named shaft and having a set of upstanding lugs engaging the jaws of said first clutch member, and a second set of upstanding lugs having their jaw faces disposed at right angles to the jaw faces of said first set of lugs and adapted to be engaged by the jaws of said second clutch member when said slidable member is moved on said second shaft; substantially as described.

5. A clutch comprising the combination of a shaft, a clutch member fastened to said shaft and having a plurality of slotted jaws, a second shaft, a member slidably mounted on said second shaft, a second clutch member attached to said slidable member and having a plurality of slotted jaws, an intermediate clutch member associated with said first-named shaft and having a set of upstanding lugs engaging the jaws of said first clutch member and a second set of upstanding lugs disposed at right angles to said first set of lugs and adapted to be engaged by the jaws of said second clutch member when said slidable member is moved on said second shaft, and means covering the slotted jaws of said first clutch member for preventing the engagement therewith of the jaws of said second clutch member; substantially as described.

6. A clutch comprising the combination of a shaft, a clutch member fastened to said shaft and having a plurality of jaws one of which differs in width from the remaining jaws, a second shaft, a member slidably mounted on said second shaft, a second clutch member attached to said slidable member and having a plurality of jaws, some of said jaws being of different widths than the others, and an intermediate clutch member associated with said first shaft and having jaws adapted to engage the jaws of said first clutch member in one relationship and having also other jaws adapted to be engaged by the jaws of said second clutch member in a definite relationship when said slidable member is moved on said second shaft; substantially as described.

7. A clutch comprising the combination of a shaft, a clutch member fastened thereto and having two groups of jaws, a second shaft, a member slidably mounted thereon, a second clutch member attached to said slidable member and having two groups of jaws, and an intermediate clutch member associated with said first shaft and having two groups of jaws engaging the two groups of jaws of said first clutch member and having also two other groups of jaws adapted to be engaged by the two groups of jaws of said second clutch member when said slidable member is moved on said second shaft, said groups of jaws on each of said clutch members being so formed and proportioned that the clutch members can only be engaged with each other in a definite relationship; substantially as described.

8. A clutch comprising the combination of a shaft, a clutch member thereon having two groups of clutch jaws disposed on opposite sides of the axis of the shaft, a second shaft, a second clutch member slidable thereon and provided with two groups of clutch jaws on opposite sides of the axis of the shaft, and an intermediate clutch ring mounted on one of the shafts and provided with four groups of clutch jaws spaced apart around the ring and adapted to coact with the jaws of the two clutch members; substantially as described.

9. A clutch comprising the combination of a shaft, a clutch member thereon having two groups of clutch jaws disposed on opposite sides of the axis of the shaft, a second shaft, a second clutch member slidable thereon and provided with two groups of clutch jaws on opposite sides of the axis of the shaft, an intermediate clutch ring mounted on one of the shafts and provided with four groups of clutch jaws spaced apart around the ring and adapted to coact with the jaws of the two clutch members, and means for preventing inter-engagement of the clutch jaws of the two clutch members; substantially as described.

10. A clutch comprising the combination of a shaft, a clutch member thereon having two groups of clutch jaws disposed on opposite sides of the axis of the shaft, a second shaft, a second clutch member slidable thereon and provided with two groups of clutch jaws on opposite sides of the axis of the shaft, and an intermediate clutch ring mounted on one of the shafts and provided with four groups of clutch jaws spaced apart around the ring and adapted to coact with the jaws of the two clutch members, the jaws of the several groups being so spaced as to insure engagement in a definite relation of the jaws of the two clutch members with those of the intermediate ring; substantially as described.

In testimony whereof I affix my signature.

GREGORY C. DAVISON.